July 31, 1934.    V. G. APPLE    1,968,590
BRAKE
Filed Nov. 14, 1929    2 Sheets-Sheet 1

INVENTOR.
Vincent G. Apple
BY
Burton & McConkey
ATTORNEYS

Patented July 31, 1934

1,968,590

UNITED STATES PATENT OFFICE 1,968,590

BRAKE

Vincent G. Apple, Dayton, Ohio, assignor to Bendix Brake Company, South Bend, Ind., a corporation of Illinois Application November 14, 1929, Serial No. 407,082

7 Claims. (Cl. 188—156)

My invention relates to improvements in brakes and has particular reference to the type commonly used on automotive vehicles.

An object of my invention is to provide a simply constructed and efficiently operating power brake assembly for use on the front or steerable wheel of an automotive vehicle, much the same as that described in my Patent No. 1,876,541 and reissue thereof, Serial No. 686,139, wherein the construction is broadly disclosed and claimed and to utilize therewith an electromagnet or solenoid as a power source.

Another object of my invention is to include in such a front wheel solenoid power brake assembly an operating member so connected to the brake shoe actuating mechanism that the latter may be manually operated by the vehicle driver, either independently of or in conjunction with the solenoid, from a point outside the enclosed brake drum.

Figure 1:
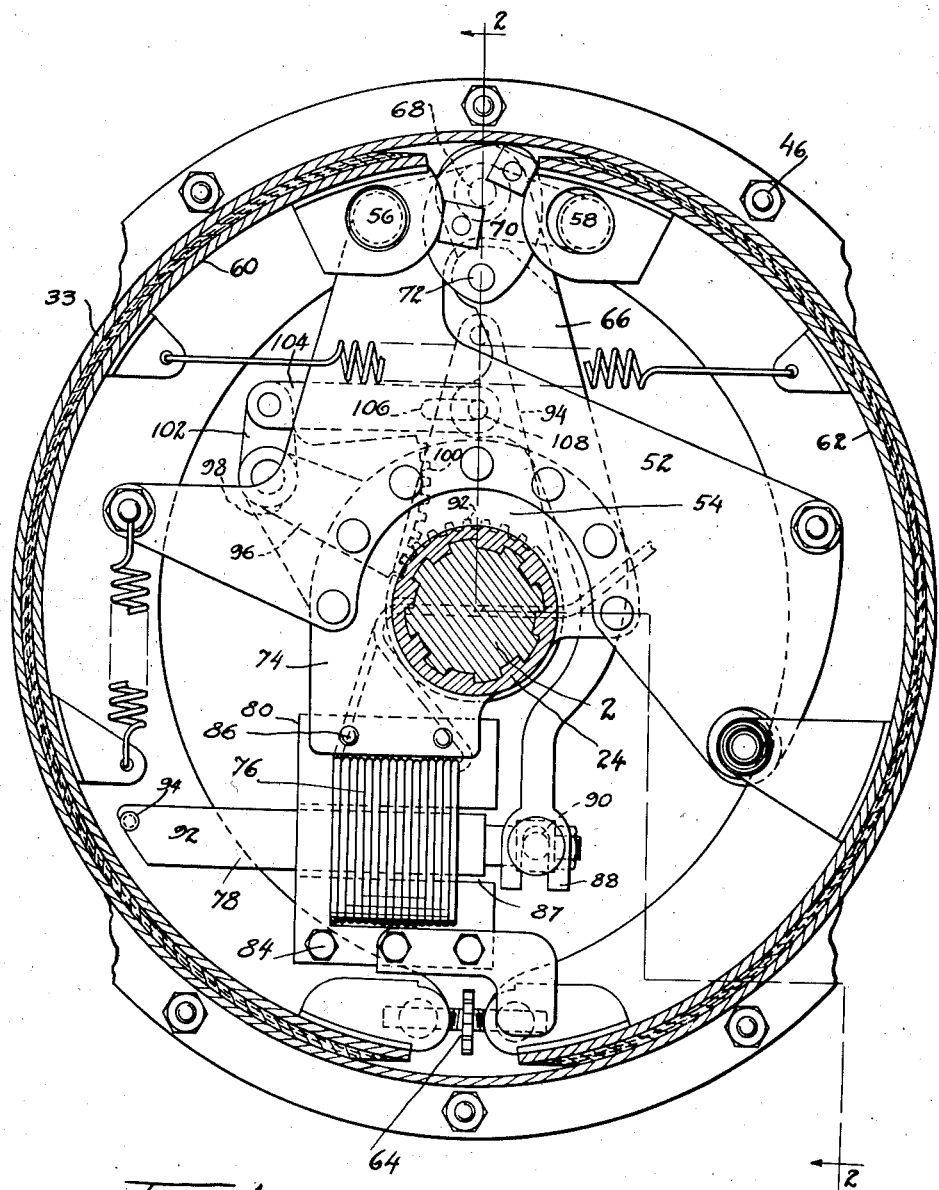
Figure 2:
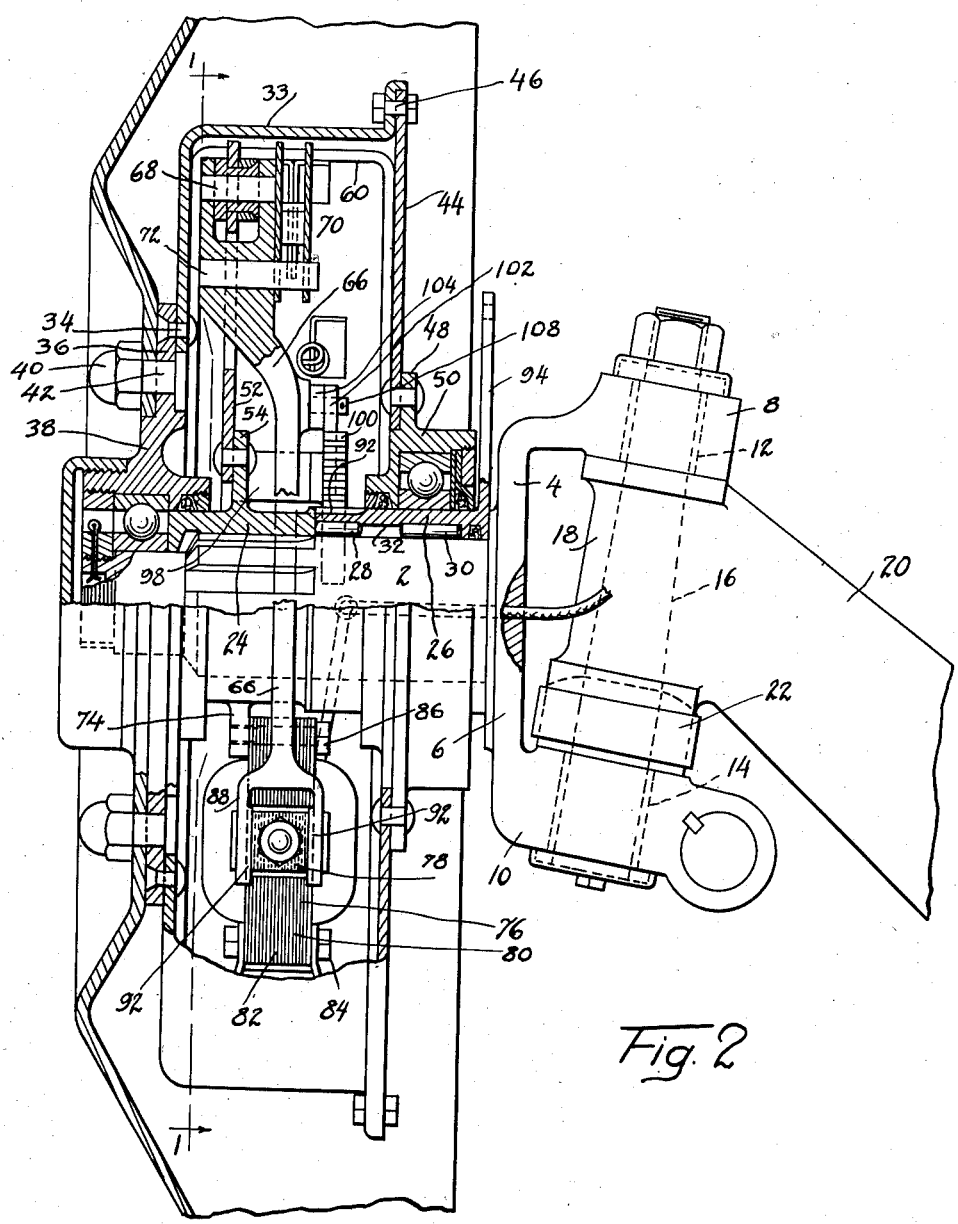

Further objects will be apparent from the following description taken in conjunction with the accompanying drawings wherein like numerals refer to like parts throughout the several figures, and wherein Fig. 1 is a transverse section taken on the line 1—1 of Fig. 2, and Fig. 2 is a vertical axial section taken on the line 2—2 of Fig. 1.

In the drawings the steering knuckle comprises the usual spindle 2 having radially extending arms 4 and 6 which carry the hubs 8 and 10 for the bushings 12 and 14. The steering pivot or king pin 16 is tightly secured in the hub 18 of axle 20 and rotatable in the bushings 12 and 14. The anti-friction thrust bearing 22 under the hub 18 takes the vertical steering load. On the outer end of the spindle 2 is keyed a hub member 24 and on the inner end is rotatably journalled the sleeve member 26 by means of the roller bearings 28 and 30, which bearings are located axially on the spindle by means of the spacer member 32.

A brake drum 33 is riveted, as at 34, to the flange 36 of the wheel hub 38 and this combination is bolted together with the wheel proper by means of the nuts 40 and the bolts 42. The cover plate 44 is bolted as at 46 to the open inner end of the brake drum and is provided with a central aperture which is riveted to the flange 48 of the bearing housing 50. There is another bearing housing in the hub 38 and the wheel and drum assembly is thus rotatably journalled on the spindle 2 at its outer end and on the sleeve 26 at its inner end.

The torque plate 52 is riveted to a radially extending flange 54 on the hub member 24 and carries the studs 56 and 58 which serve as anchors for adjacent ends of the radially expansible friction shoes 60 and 62. The other adjacent ends of the two friction shoes are connected by means of the right and left screw adjustment mechanism 64. The brake operating lever 66 is fulcrumed between the two anchored ends of the brake shoes 60 and 62 by means of a third stud 68 which is carried by the torque plate, and carries the conventional camming mechanism broadly indicated at 70 pivoted thereto at 72 for the purpose of expanding the shoes 60 and 62 into engagement with the inner periphery of the drum 33.

Depending from the hub member 24 is the flange 74 to which is bolted the solenoid 76 which constitutes the power means for actuating the brake arm 66 to operate the brakes. This solenoid is of the same general type described by me in detail in my copending application Serial No. 404,236, filed November 2, 1929 except for the fact that the plunger, or armature coil, 78 operates in the opposite direction. This solenoid consists of a field core 80 which is made up of a plurality of laminae 82 held together by the bolts 84 and the cap screws 86, which secure the field to the depending flange 74. The field laminae 82 are of rectangular outer and inner contour and thus compose a continuous rectangular frame except for the fact that it is cut away at 87 to admit the armature core 78, which is illustrated in Fig. 2 in the position which it reaches when it has applied the brakes to their full "on" position.

The two ends of the solenoid coil are connected to a conductor cable which extends transversely through the spindle 2, emerging therefrom at a point outside the drum enclosure where it is connected to a source of current supply, not shown here because it forms no part of the present invention. However, a control which includes means for varying the current supplied to the coil is preferable.

The bifurcated lower end 88 of the brake operating lever 66 straddles a spacing stud 90 on one end of the armature core 78 to form an operative connection between the two. Thus the movement of the armature core 78, when the solenoid 76 is energized, actuates the lever 66 to apply the brakes through the action of the cam mechanism which I have indicated broadly at 70.

The means which I have incorporated in this brake assembly for operating the brakes manually from a point outside the drum enclosure is controlled by the sleeve 26, which extends from within to a point outside the drum, and is provided on its inner end with gear teeth 92 and on its outer end with a radially extending arm 94. A sector lever 96 is pivoted to the boss 98 which is formed on the torque plate 52 and is provided with gear teeth 100 which mesh with the teeth on the sleeve 26. The sector lever has an arm 102 to which is pivoted a link 104 and this link is connected to the brake operating lever 66 through an elongated slot 106 which engages the stud 108 on the said operating lever. Thus a slip joint between the sector lever 96 and the brake operating lever 66 is provided whereby the said lever may be actuated to apply the brake shoes either independently of or in conjunction with the solenoid 76.

The arm 94 may be connected up to the brake operating pedal by means of any desirable mechanical linkage, and the sleeve thus rotated to apply the brakes manually.

Having illustrated and described a single embodiment of my invention various modifications will be apparent to those skilled in the art, and I therefore intend to limit myself only within the scope of the appended claims.

I claim:

1. Brake mechanism comprising a non-rotatable swivelled wheel spindle having a hub keyed thereto and a sleeve rotatably journalled thereon, a rotatable closed brake drum having bearing surfaces on the spindle and sleeve, brake shoe actuating mechanism and a solenoid supported within said drum by the hub, a lever operatively connecting said actuating mechanism with the solenoid plunger, and a lost motion connection between said sleeve and said lever whereby rotation of the former will operate the lever independently of the solenoid.

2. Brake mechanism comprising a swivelled wheel spindle secured against rotation, a closed drum rotatably journalled thereon, radially expansible friction means and a solenoid secured against rotation within the drum, camming means for expanding the friction means likewise secured within the drum, a lever operatively connecting the solenoid with the camming means, a part rotatable within said drum from a point outside, and a lost motion connection between said lever and said part whereby rotation of the latter will actuate said lever independently of the solenoid.

3. Brake mechanism comprising a swivelled wheel spindle secured against rotation by one end, a hub secured against rotation thereon, a sleeve having an arm at each end thereof rotatable about said spindle adjacent said hub, brake shoes and a solenoid supported by the hub, a cam arm for actuating the brake shoes operatively connected to the solenoid, a closed drum rotatably journalled on the spindle and said sleeve intermediate its arms, and a lost motion connection between said sleeve and cam arm whereby rotation of the former actuates the latter independently of the solenoid.

4. Brake mechanism comprising a non-rotatable swivelled wheel spindle, a closed brake drum rotatably journalled thereabout, brake shoes and a solenoid secured against rotation within the drum, a camming arm operable by the solenoid to actuate the brake shoes, and means operable from outside the drum having a lost motion connection with said camming arm whereby the brakes may be manually actuated independently of the solenoid.

5. Brake mechanism comprising, in combination, a rotatable brake drum, brake mechanism arranged therein to be urged thereagainst, a solenoid coupled with the brake mechanism to actuate the same, a swingably supported gear section coupled with the brake mechanism to actuate the same and a manually rotatable part engaging said gear section to swing the same.

6. Brake mechanism comprising in combination a non-rotatable axle, a closed drum rotatably journalled therein, expansible friction means and a solenoid for expanding the same secured against rotation within the drum, a sleeve rotatable about said axle, operative connections within the drum between said friction means and said sleeve, including a gear sector, and means operable from a point outside the drum for rotating said sleeve whereby the friction means may be expanded independently of the solenoid.

7. Brake mechanism comprising in combination a non-rotatable axle, a closed drum rotatably journalled thereon, expansible friction means and a lever for expanding the same supported against rotation within the drum, a solenoid supported within the drum connected with said lever, a sleeve rotatable about said axle from a point outside the drum and provided with gear teeth at its inner extremity, a gear sector pivoted within the drum and meshing with said gear teeth, and a lost motion connection between said gear sector and lever whereby the friction means may be expanded independently of the solenoid.

VINCENT G. APPLE.